United States Patent [19]

Davis

[11] 4,332,217
[45] Jun. 1, 1982

[54] CONTROLLED RATE EXERCISER AND METHOD OF CONDITIONING

[75] Inventor: Grover M. Davis, Audubon, Iowa

[73] Assignee: Talbot-Carlson, Inc., Audubon, Iowa

[21] Appl. No.: 177,279

[22] Filed: Aug. 11, 1980

[51] Int. Cl.³ .............................................. A61D 11/00
[52] U.S. Cl. ........................................ 119/29; 119/158
[58] Field of Search .................................. 119/29, 158

[56] References Cited

U.S. PATENT DOCUMENTS 2,611,341  9/1952  Paris ..................................... 119/158
3,485,213  12/1969  Scanlon .................................. 119/29
4,183,329  1/1980  Leonaggeo, Jr. ...................... 119/158

Primary Examiner—Hugh R. Chamblee
Attorney, Agent, or Firm—Henderson & Sturm

[57] ABSTRACT

An animal exercising apparatus of a type having a frame, a treadmill for providing a moving supported surface for an animal for allowing the animal to run in place, including a container disposed around and above the treadmill for sealingly receiving a liquid whereby an animal supported by the treadmill will be standing in the liquid within the container.

3 Claims, 14 Drawing Figures

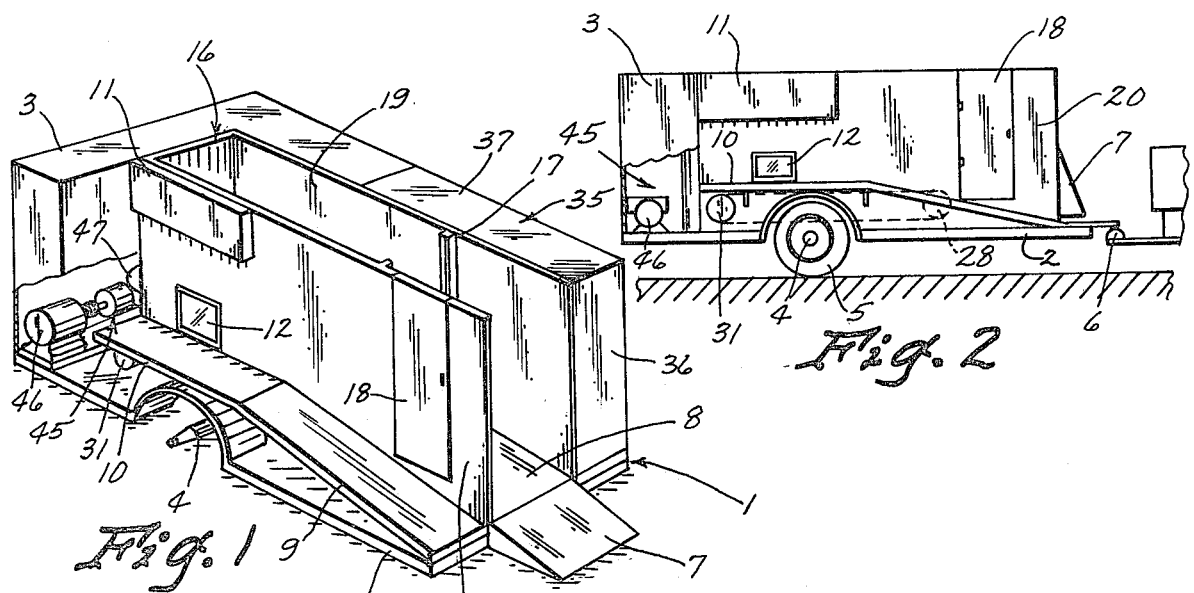
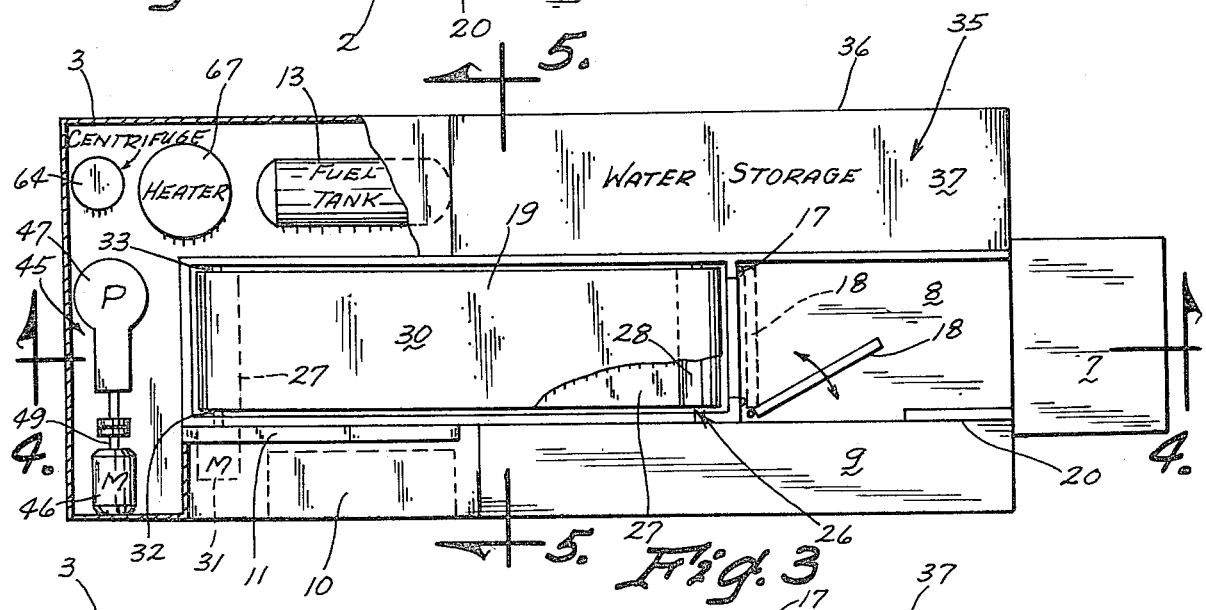
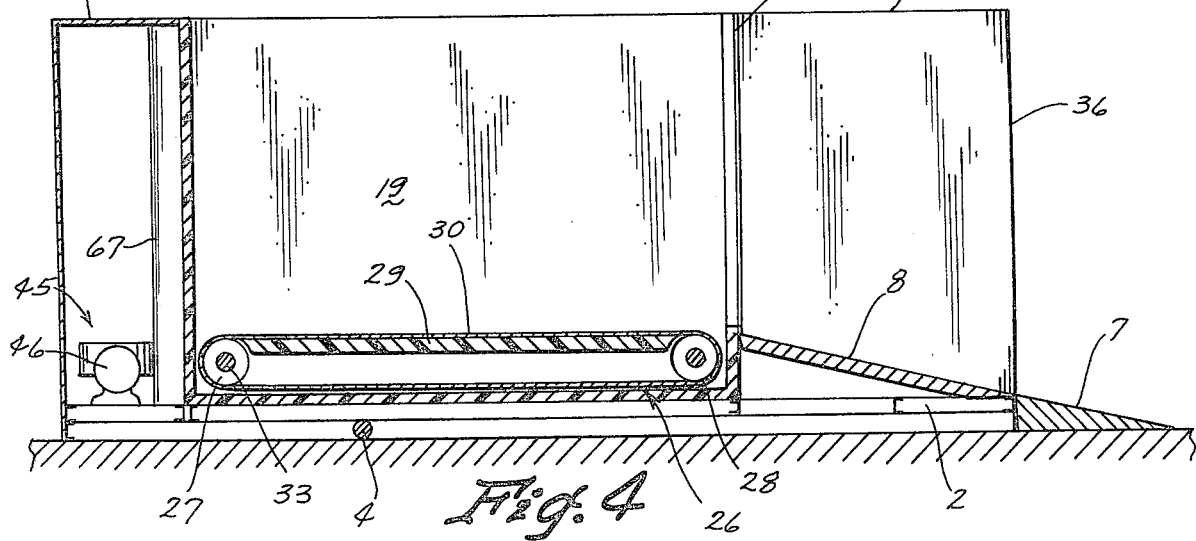

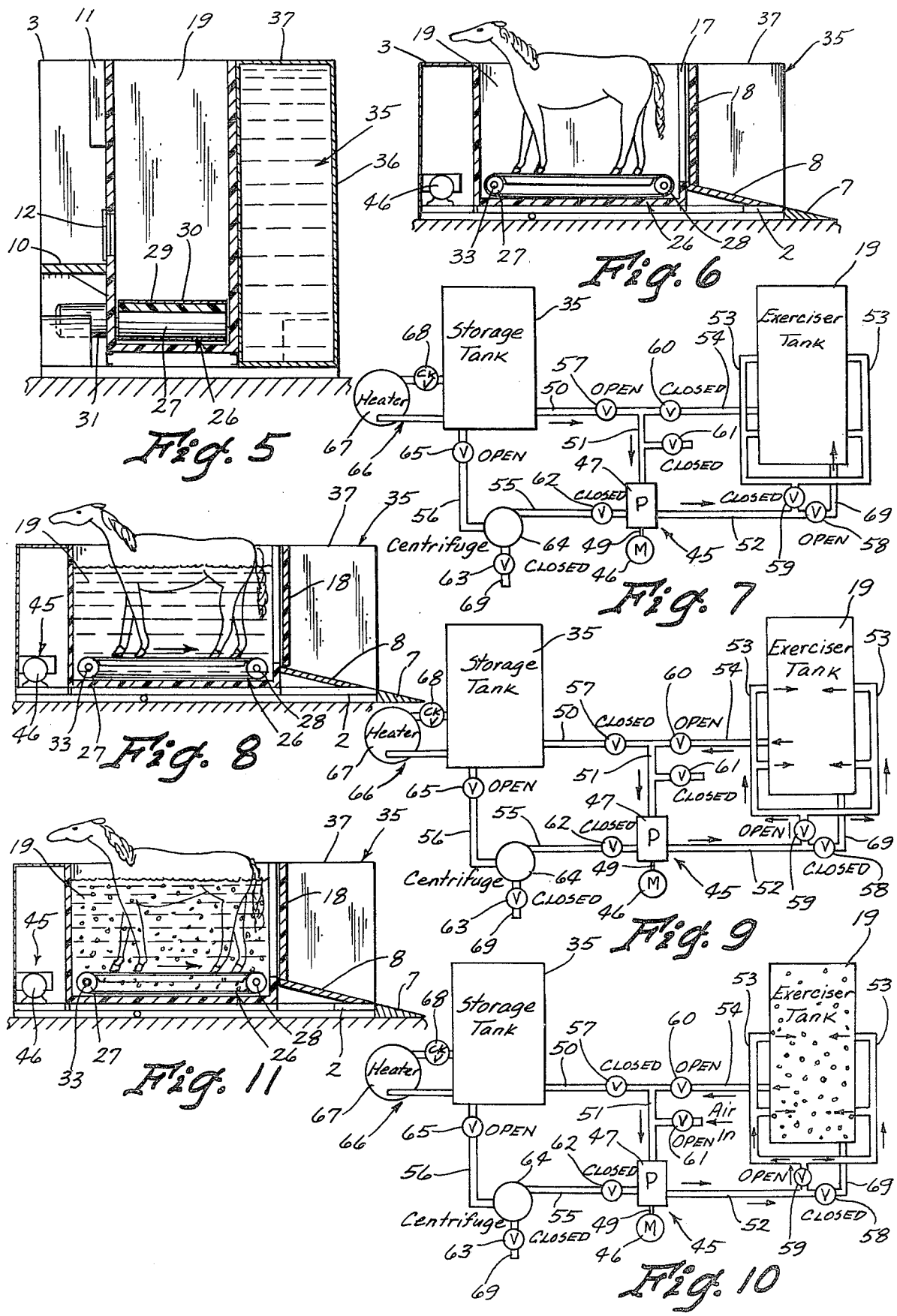

CONTROLLED RATE EXERCISER AND METHOD OF CONDITIONING

SUMMARY OF THE INVENTION

The present invention relates to an animal exercising apparatus of a type including a frame having a treadmill attached thereto for providing a moving supported surface for an animal for allowing the animal to run in place. A container is disposed around and above said treadmill means for sealingly receiving a liquid whereby an animal supported by the treadmill means will be standing in the liquid within said container.

An object of this invention is to provide an improved animal exercising apparatus.

Another object of this invention is to provide an exercising apparatus for injured animals which provides controlled, progressive increase in required exercise effort.

An additional object of this invention is to provide an inexpensive, transportable means of exercising injured animals while yet providing substantial recovery value to the owner upon eventual resale of the apparatus.

A further object of this invention is to provide an animal exercising apparatus which affords a safe, regulated, and monitorable environment for exercising weak or injured animals.

A still further object of this invention is to provide an animal exercising apparatus which stimulates development and recovery of weak or injured animals through the use of a turbulent, massaging liquid bath.

Other objects, advantages, and novel features of the present invention will become apparent from the following detailed description of the invention when considered in conjunction with the accompanying drawings.

BACKGROUND OF THE INVENTION

The present invention relates generally to an animal exercising apparatus, and more particularly to an animal exercising apparatus of an improved design which provides a means for variably displacing an exercising animal's weight such that stress upon its lower limbs can be reduced.

There have been many attempts to provide a suitable exercising device for animals of a general type having a treadmill apparatus upon which an animal either runs or walks. Examples of such devices are shown in U.S. Pat. Nos. 3,709,197; 3,952,704; and 4,095,561. Solutions to the problems of limb support and belt friction inherent in these devices were presented in U.S. patent application Ser. No. 052,348, now U.S. Pat. No. 4,227,487 which is incorporated herein by reference.

However, an injured or weak animal may not be able to place its full weight upon its lower limbs during exercise. Effective conditioning and rehabilitation of such animals, therefore, demands a controlled, progressive increase in required exercise effort. A number of devices have attempted to provide a solution to this problem by immersing the animal in a body of water so as to displace some or all of the animal's weight from its lower limbs. U.S. Pat. Nos. 3,424,133 and 3,691,995 are examples of such devices whereby an animal is exercised in a stationary water tank or swimming pool.

U.S. Pat. No. 3,691,995 teaches the use of a circular, concrete water-filled tank whereby an attendant supervises the animal while it swims around the tank. Such a tank, however, is limited in its utility since due to its permanent, recessed design, it cannot be transported to the location of the injured or weak animal. Additionally, construction and installation costs of a large, concrete swimming pool can often be prohibitive due to the permanent nature and size of the tank.

Another problem typical to large, installed tanks when utilized with injured animals is the relative inability to closely monitor and regulate the exercise of the animal. In U.S. Pat. No. 3,691,995, for example, the attendant stands on an island in the center of the tank and must physically pull the animal to safety on higher ground if necessary. Additionally, since these installed tanks are primarily designed to facilitate swimming rather than walking, they fail to incorporate any effective means for variably regulating displacement of the animals weight so as to progressively stimulate hock, ankle and limb exercise through a walking or running motion.

U.S. Pat. No. 3,424,133 shows the use of an exercising attachment utilized in conjunction with a fixed water tank. Though this invention discusses the variable displacement of animal weight by varying the tank water level and/or application of flotation devices to the animal, it fails to solve the aforementioned problems inherent with fixed tanks; namely, portability, cost and monitorability. Further, inasmuch as the need for an animal exercising device may be only temporary or transient, the stationary nature of a fixed, exercising tank inhibits the sale and transfer of such a device when one's need for its use has abated.

Finally, U.S. Pat. No. 3,598,088 teaches the use of a livestock dip apparatus to submerge an animal in a liquid solution contained within either a portable or permanently fixed tank. Such a device, however, presents a very costly and complicated structure necessitating physical raising and lowering of the animal. Additionally, a treadmill assembly, if incorporated therein, would necessarily have to accommodate total submersion within the liquid.

Consequently, there is a need for an animal exercising apparatus utilizing a treadmill assembly to confine the required exercise area as distinguished from a large tank or swimming pool; an efficient, low cost method of variably displacing a desired amount of animal weight; a structure allowing close observation and monitoring of the semi-submerged animal; and a portable exercising device which can be readily moved to a desired location and has potential resale value to the owner once the need for its use has abated.

BRIEF DESCRIPTION OF THE DRAWINGS

FIG. 1 is a perspective view of an embodiment of the invention in a stationary configuration with the forward enclosure partially broken-away to expose the motor and pump assembly;

FIG. 2 is a side-elevational view of the present invention in a mobile, towed position;

FIG. 3 is a top plan view with the forward enclosure broken-away and the treadmill belt partially broken-away to expose the belt supporting structure;

FIG. 4 is a cross-sectional elevational view taken along lines 4—4 of FIG. 3;

FIG. 5 is a cross-sectional view taken along lines 5—5 of FIG. 3;

FIG. 6 is a side elevational view as shown in FIG. 4 with an animal in position in the exercise tank and the exercise tank devoid of liquid;

FIG. 7 is a schematic view of the invention shown in the exercise tank fill mode;

FIG. 8 is a side elevational view as shown in FIG. 4 with the exercise tank filled with liquid and the treadmill mechanism in motion;

FIG. 9 is a schematic view of the invention in the recirculating massage mode;

FIG. 10 is a schematic view of the invention in the aerated-massage mode;

FIG. 11 is a side, cross-sectional view as shown in FIG. 8, with the invention in the aerated-massage mode;

DESCRIPTION OF THE PREFERRED EMBODIMENT

Figure 12:
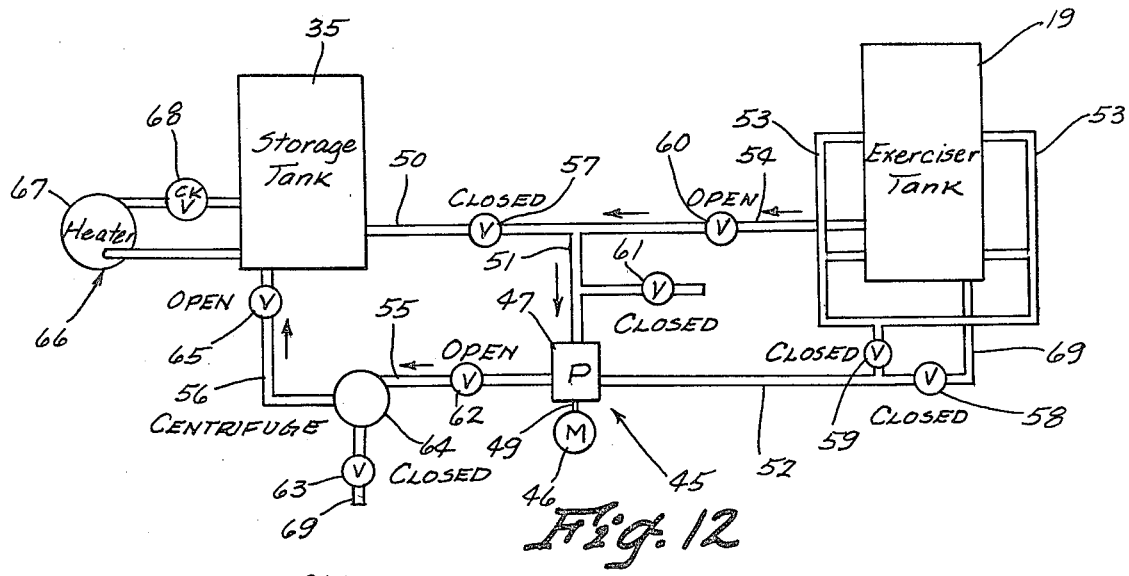
FIG. 12 is a schematic view of the invention in the storage tank fill mode.

Referring now to the drawings wherein like reference numerals designate identical or corresponding parts throughout the several views, FIGS. 1 and 3 show the basic elements of the present invention comprising a frame 1, an exercise tank 19, a treadmill assembly 26, a storage tank 35 and a pump assembly 45.

The frame 1 consists generally of a rigid platform 2. A forward enclosure 3 is removably attached to the frame to enclose the pump assembly 45. As shown in FIG. 1, an axle 4 is rigidly attached beneath said frame. FIG. 2 shows the invention whereby wheels 5 are removably attached to the axle 4 and a towing member 6 is also provided to facilitate transportation of the invention. An access ramp 7 is hingedly attached to the frame 1 (FIG. 4) such that, in conjunction with a fixed ramp 8, a continuous inclined surface is provided for animal access to the treadmill assembly 26.

The exercise tank 19 consists of rigid walls, generally indicated at 16, attached to the frame, the rear wall 17 of which is cut out to sealingly receive a water-tight door 18. The door 18, when in the closed position (dotted lines in FIG. 3) sealingly forms the exercise tank 19 for containment of an exercising animal and/or liquid. The water-tight door 18 is hingedly attached to the left side wall 20 such that when in the open position (FIG. 1), it flushly mounts in the left side wall.

Within the exercise tank 19, the treadmill assembly 26 provides the animal exercising surface. The treadmill assembly 26, similar to that shown in U.S. patent application Ser. No. 052,348, now U.S. Pat. No. 4,227,487, which is incorporated herein by reference, consists generally of a first roller 27 rotatably fixed within the side walls of the exercise tank 19 and a second roller 28 similarily fixed within the tank 19. A supporting means 29 is disposed between the first and second rollers, while an endless belt 30 is disposed around the rollers. A belt drive motor 31 is rigidly fixed outside the left side wall 20 such that a drive motor output shaft 32 sealingly penetrates the wall 20 and is operably connected to a first roller axle 33. Operation of the drive motor 31 causes the belt 30 to travel around rollers at an infinitely variable speed up to a maximum of four (4) miles per hour, thereby stimulating movement on the part of the animal.

A storage tank 35 is constructed of walls 36 and cover 37 so as to provide a sealed container for storage of liquid. The storage tank 35 is in fluid communication with the exercise tank 19 via a pump assembly 45. An embodiment of the present invention utilizes a water heater 67 rigidly attached to the frame 1 beneath the forward enclosure 3 as shown in FIG. 3. A fuel tank 13, similarly fixed to the frame 1, supplies fuel to the water heater in order to maintain the water at a desired temperature. The water heater 67 is fluidly connected to the storage tank 35 by means of a piping assembly 66 with a check valve 68 installed on the water heater discharge side. The storage tank cover 37 should be either vented or hingedly attached to the walls 36 in order to discourage pressurization of the storage tank during pumping operations.

The pump assembly 45, as shown in FIGS. 3, 7, 9, 10, 12-14, consists generally of a motor 46, a pump 47 and a piping and valve assembly generally indicated at 48. The motor 46 and pump 47 being fixedly attached to the frame 1 such that a motor output shaft 32 is operably connected to the pump. The piping and valve assembly 48 consists generally of transfer piping sections 50, 51, 52, 53, 54, 55, 56 and 69 as well as valves 57, 58, 59, 60, 61, 62, 63 and 65. Piping section 53 consists of a plurality of discharge nozzles fixedly penetrating the walls 16 of the exercise tank 19 so as to provide turbulent discharge of recirculating liquid.

In operation, the trainer leads an animal up ramps 7 and 8 into the exercise tank 19. The trainer, walking up a personnel ramp 9 to an operating platform 10, may then observe and control the operation of the invention with an operating panel 11 fixedly mounted to the left side wall 20 of the exercise tank 19. Additionally, the operator may observe the motion of the endless belt 30 through a transparent observation window 12 which is sealingly installed in the left side wall 20. The invention may be utilized either with or without the introduction of liquid from the storage tank 35 into the exercise tank 19.

Referring now to FIGS. 7-14, to fill the exercise tank 19 with liquid, the operator energizes the pump assembly 45, opens valves 57, 58 and 65, and closes valves 59, 60, 61, 62 and 63. Liquid is then pumped from the storage tank 35 to the exercise tank 19 through piping sections 50, 51, 52 and 69 as shown by the arrows in FIG. 7. When the exercise tank 19 is filled with liquid such that the desired displacement of animal weight is achieved, a turbulent massaging action can be obtained, if desired, as shown in FIG. 9, by continuing operation of the pump assembly 45 while closing valves 57 and 58 and opening valves 59 and 60. Liquid will then be recirculated through piping sections 51, 52, 53 and 54 so as to provide the desired massaging effect upon the animal in the exercise tank 19. Pump selection can be used to influence the type of turbulent massage obtained within the exercise tank; a reciprocating pump providing a surging effect, whereas a centrifugal pump providing a more constant flow within the tank. Also in this configurement, air inlet valve 61 can be opened to aerate the storage tank in order to reduce bacteria and odor. Further, aerated massage can be obtained as shown in FIGS. 10 and 11 through continued operation of the pumping means as previously discussed while opening air inlet valve 61 to admit air into the stream of recirculating liquid on the suction side of the pump 47.

To drain the liquid from the exercise tank 19 and return it to the storage tank 35, the pump assembly 45 is operated with valves 57, 58, 59, 61 and 63 closed and with valves 60, 62 and 65 open. Liquid is then pumped through piping sections 51, 54, 55 and 56 as shown by the arrows in FIG. 12.

Figure 13:
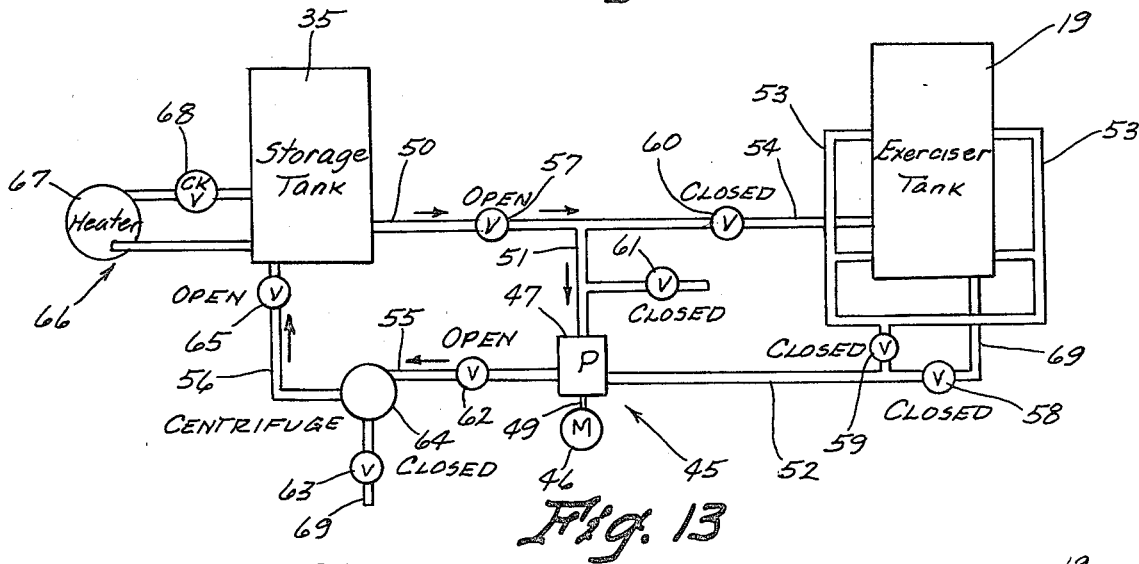
FIG. 13 is a schematic view of the invention in the storage tank recirculation mode.
Figure 14:
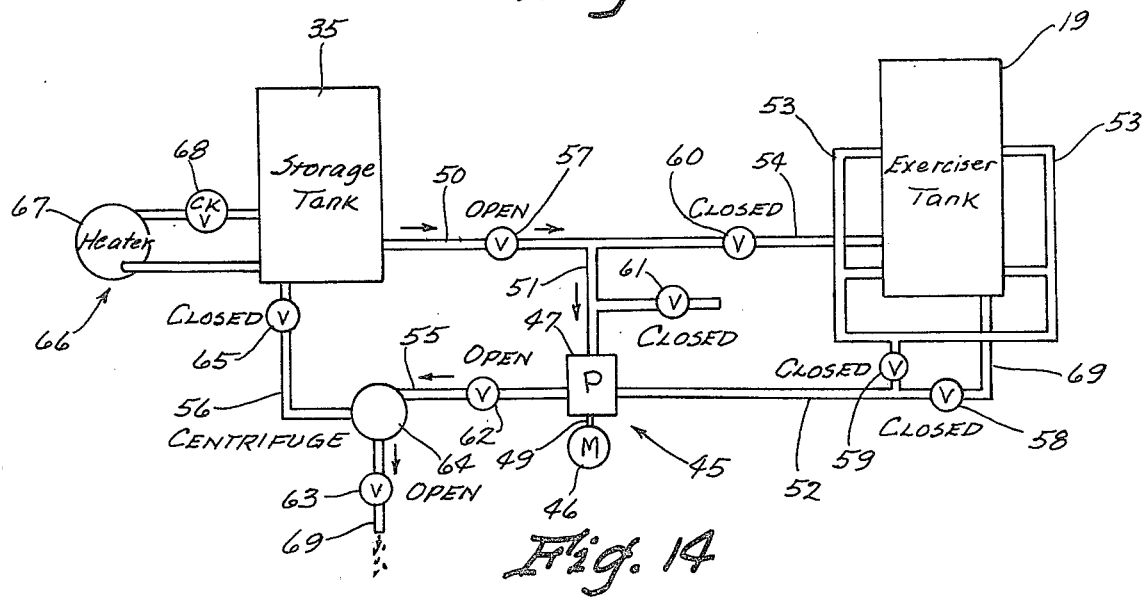
FIG. 14 is a schematic view of the invention in the effluent discharge mode.

FIG. 13 shows the method of cleaning of liquid in the storage tank 35 whereby a centrifuge is shown connected to pipes 55 and 56. In this mode, the pump assembly 45 is operated with valves 57, 62 and 65 opened such that liquid is recirculated through piping sections 50, 51, 55 and 56 passing through the centrifuge 64 on its return to the storage tank 35. Referring to FIG. 14, to discharge particulate-laden liquid, valve 63 is opened and valve 65 is closed, while at the same time running pump assembly 45 and centrifuge 64, such that effluent is discharged through drain pipe 69.

A typical use for the above identified invention would be for conditioning a horse that has an injured leg. In such a case, it may be desirable to fill the exerciser tank to a maximum level such that the horse's body is substantially lifted up off of the treadmill so that very little pressure is exerted on the legs of the horse while the treadmill is running. Over a period of days, weeks and months, however, the level of the water in the exercise tank 19 would be gradually reduced in each daily session, allowing the horse to put progressively more weight on its legs while running in place on the treadmill 26, until such time that the leg has recovered and the horse does not need any water at all in the exercise tank and can exercise on the treadmill 26 with all of its weight on its legs.

Optional features contemplated but not shown in the drawings include load cells and indicators to determine the effective animal weight upon the belt, a speedometer for showing the belt speed, a liquid temperature indicator and sensor, and an animal pulse rate indicator.

Obviously, many modifications and variations of the present invention are possible in light of the above teaching. It is therefore to be understood that, within the scope of the appended claims, the invention may be practiced otherwise than as specifically described.

I claim:

1. An animal exercising apparatus comprising:

a frame;

treadmill means for providing a moving supported surface for an animal for allowing the animal to run in place, said treadmill means including a first roller; a second roller; a supporting means disposed between said first and second rollers; an endless belt disposed around said first and second rollers and said supporting means; and belt moving means for causing said endless belt to move around said first and second rollers;

container means disposed around and above said treadmill means for sealingly receiving a liquid whereby an animal supported by said treadmill means will be standing in the liquid within said container, said container means including a door means on one end thereof for allowing an animal to enter said container means;

filling means for filling said container means with a liquid;

draining means for draining a liquid out of said container means;

liquid holding tank means connected to said filling means and to said drainage means for holding a liquid for reuse when it is drained from said container;

means for producing massaging turbulence within said container means;

a centrifuge means for cleaning solids from the liquid;

liquid heating means connected to said liquid holding tank for heating the liquid to a desired temperature;

air inlet means connected upstream of said filling means for aeration of said container means and said liquid holding tank means; and a transparent observation window means disposed in the lower portion of said container means for observing the legs of the animal while said treadmill means is in use.

2. An animal exercising apparatus as defined in claim 1 wherein said belt moving means comprises means for rotating one of said first and second rollers.

3. An animal exercising apparatus as defined in claim 1 wherein said container means includes first, second, third, fourth, fifth and sixth ports therein, a first conduit means being connected to said container means for fluidly connecting said first, second, third and fourth ports together, said draining means including a pump and a second conduit means connected to said container means for connecting said container means to an outlet of said pump; and first valve means disposed in said second conduit means for opening or closing said second conduit means; third conduit means for fluidly connecting said first conduit means to said second conduit means between said pump and said first valve means and having a second valve means disposed in said third conduit means for selectively opening or closing said third conduit means; fourth conduit means for fluidly connecting the sixth port of said container means with a first port in said liquid holding tank and having third and fourth valve means disposed in said fourth conduit means for selectively opening or closing selected portions of said fourth conduit means; fifth conduit means connected to said fourth conduit means and to an inlet of said pump, said air inlet means being connected to said fifth conduit means for selectively allowing air to be drawn into said fifth conduit means by the action of said pump; sixth conduit means connected to a second port in said liquid holding tank and to a liquid outlet of said centrifuge means, and having a fifth valve means disposed within said sixth conduit means for selectively opening or closing said sixth conduit means; a first outlet means on said centrifuge means for permitting heavy sludge matter to exit therefrom and having a sixth valve means attached thereto for selectively opening or closing said first outlet means of said centrifuge means; seventh conduit means for fluidly connecting a liquid inlet of said centrifuge means to the outlet of said pump and having seventh valve means disposed therein for selectively opening or closing said seventh conduit means.

* * * * *